United States Patent [19]

Okazaki et al.

[11] Patent Number: 5,336,079
[45] Date of Patent: Aug. 9, 1994

[54] BIAXIALLY ORIENTED LAMINATED FILM COMPRISING PARTICLES IN A SPECIFIC RATIO OF PARTICLE DENSITY

[75] Inventors: Iwao Okazaki; Koichi Abe, both of Kyoto; Hidehito Minamizawa, Otsu; Takeo Fukuyama, Hikone, all of Japan

[73] Assignee: Toray Industries, Inc., Japan

[21] Appl. No.: 847,586

[22] Filed: Mar. 4, 1992

[30] Foreign Application Priority Data

| Mar. 6, 1991 | [JP] | Japan | 3-63783 |
| Mar. 6, 1991 | [JP] | Japan | 3-63785 |
| Mar. 25, 1991 | [JP] | Japan | 3-82973 |
| Sep. 25, 1991 | [JP] | Japan | 3-271805 |
| Sep. 25, 1991 | [JP] | Japan | 3-271807 |
| Sep. 26, 1991 | [JP] | Japan | 3-273443 |
| Jan. 7, 1992 | [JP] | Japan | 4-18247 |

[51] Int. Cl.⁵ ............................................. B32B 5/16
[52] U.S. Cl. ........................... 428/323; 428/327; 428/328; 428/329; 428/331; 428/409; 428/694 SG; 428/910
[58] Field of Search ........... 428/327, 328, 329, 331, 428/694, 900, 409, 323, 910, 694 SG, 694 ST

[56] References Cited

U.S. PATENT DOCUMENTS

| 4,693,932 | 9/1987 | Kuze et al. | 428/323 |
| 4,952,449 | 8/1990 | Okazaki et al. | 428/147 |
| 4,990,400 | 2/1991 | Endo et al. | 428/331 |
| 5,069,962 | 12/1991 | Okazaki et al. | 428/323 |
| 5,084,335 | 9/1992 | Nakano et al. | 428/323 |
| 5,096,773 | 3/1992 | Sakamoto | 428/323 |
| 5,096,875 | 3/1992 | Martin | 503/227 |

FOREIGN PATENT DOCUMENTS

| 59-171623 | 9/1984 | Japan. |
| 3-1941 | 9/1991 | Japan. |

*Primary Examiner*—Paul J. Thibodeau
*Assistant Examiner*—H. Thi Le
*Attorney, Agent, or Firm*—Austin R. Miller

[57] ABSTRACT

Disclosed is a biaxially oriented laminated film having at least three layers which has excellent abrasion resistance and electromagnetic conversion property when the film is used as the base film of a magnetic recording media. The biaxially oriented laminated film comprises at least one outermost layer containing particles A, the particle density ratio at surface layer of the particles A is not less than 0.01, and the mean primary particle size D of the particles A and the thickness T of the outermost layer containing the particles A satisfies the equation; $D \leq T \leq 200D$.

20 Claims, No Drawings

BIAXIALLY ORIENTED LAMINATED FILM COMPRISING PARTICLES IN A SPECIFIC RATIO OF PARTICLE DENSITY

BACKGROUND OF THE INVENTION

1. Field of the Invention

The present invention relates to a biaxially oriented laminated film, and more particularly to a biaxially oriented laminated film suitable for the base film of a magnetic recording media, which gives a high quality image when it is used as the base film of the magnetic recording media and which has an excellent abrasion resistance.

2. Description of the Prior Art

A biaxially oriented polyester film containing practically spherical particles of colloidal silica is known and described in, for example, JP-A-SHO 59-171623. A biaxially oriented laminated polyester film which has an outermost layer containing inorganic particles and which is suitable for a base film of a magnetic recording media is also disclosed in, for example, JP-A-HEI 3-1941.

In such conventional biaxially oriented films, however, there is a problem that the surface of the film having fine protrusions is liable to be abraded by rolls and guide pieces used in, for example, magnetic solution coating process, calendering process, winding process or cassette built-in process, when the film is used as the base film of a magnetic recording media and processed into the magnetic recording media. Recently, since the speeds of the above processes increase, the problem becomes remarkable.

Further, recently, the dubbing speed of a magnetic recording media has been increased by, for example, the development of high-speed magnetic field transfer technology. With the conventional biaxially oriented films described above, when the film is used as the base film of a magnetic recording media and the image recorded in the magnetic recording media is dubbed, the signal/noise ratio (S/N) is large and it is difficult to obtain a high-quality image, particularly when the dubbing is carried out at a high speed.

SUMMARY OF THE INVENTION

An object of the present invention is to provide a biaxially oriented laminated film of which surface is hardly abraded even in high-speed processes (hereinafter, referred to as "excel in abrasion resistance"), and with which a high-quality image can be obtained when the film is used as the base film of a magnetic recording media and the image recorded in the magnetic recording media is regenerated or dubbed, that is, which has a good electromagnetic conversion property (hereinafter, referred to as "excel in electromagnetic conversion property").

To accomplish this object and other objects, a biaxially oriented laminated film according to the present invention has at least three layers and is characterized in that at least one outermost layer contains particles A, the particle density ratio at surface layer of the particles A is not less than 0.01, and the mean primary particle size D of the particles A and the thickness T of the layer containing the particles A satisfies the equation; $D \leq T \leq 200D$.

In the biaxially oriented laminated film according to the present invention, the particles A having a mean primary particle size D appropriately small relative to the thickness T of the outermost layer containing the particles A are efficiently concentrated near the surface of the layer, and the surface can be protected by effect of the particles A. Therefore, the surface of the biaxially oriented laminated film excels in abrasion resistance and is hardly abraded even in high-speed processes. Since the surface of the outermost layer is reinforced, when particles B for forming protrusions for use of the base film of a magnetic recording media are contained in the outermost layer, the protrusions formed by the particles B can be hardly abraded because the particles B and the formed protrusions are held by the reinforced surface portions positioned around the particles B. As a result, it becomes easy to form protrusions having desired size and height on the surface of the film, and when the film is used as the base film of a magnetic recording media and the image recorded in the magnetic recording media is dubbed, an excellent electromagnetic conversion property and high-quality image can be obtained.

DETAILED DESCRIPTION OF THE PREFERRED EMBODIMENTS OF THE INVENTION

Next, the present invention will be explained in more detail by embodiments and examples. However, the present invention is not restricted by the embodiments and examples.

In the present invention, the laminated film must have a lamination structure of at least three layers. The number of the layers may be three or more, i.e., may be four, five or more. However, a film of a single layer cannot satisfy good abrasion resistance and electromagnetic conversion property. Further, a laminated film of two layers is difficult to satisfy good abrasion resistance and electromagnetic conversion property, particularly difficult to satisfy a good electromagnetic conversion property when the film is used as the base film of a magnetic recording media, because, although both surfaces of the magnetic recording media are required to have desired properties, respectively, in most cases (for example, a property that one surface does not give a bad affection to the other surface when the film is wound), it is difficult to sufficiently achieve this by a two layer laminated film.

In the laminated film according to the present invention, at least one of the layers constituting the laminated film must be biaxially oriented. Particularly, it is preferable that all the layers constituting the laminated film are biaxially oriented. If all the layers are non-oriented or uniaxially oriented, the properties aimed in the present invention cannot be satisfied.

Although the material of the biaxially oriented laminated film according to the present invention is not particularly restricted, at least one outermost layer containing the particles A preferably is composed of a polyester from the viewpoint of obtaining good formation ability of surface protrusions, abrasion resistance and electromagnetic conversion property. The other layers of the biaxially oriented laminated film preferably are also composed of polyesters from the viewpoint of satisfying good mechanical properties etc.

Although polyesters employed for the biaxially oriented laminated film according to the present invention is not particularly restricted, a polyester containing at least one of ethylene terephthalate, ethylene$\alpha$, $\beta$-bis(2-chlorophenoxy)ethane-4,4'-dicarboxylate and ethylene 2,6-naphthalate as its main component is preferable.

Especially, a polyester whose main component is ethylene terephthalate is particularly preferable. With the polyester employed in the present invention, two or more kinds of polyesters may be blended and a copolymerized polymer may be used.

Particles A, or particles A and particles B are contained in at least one outermost layer of the biaxially oriented laminated film according to the present invention. Particles A have a relatively small particle size and mainly function to protect the surface of the outermost layer, i.e., the skin of the outermost layer. Particles B have a particle size greater than that of particles A and mainly function to form protrusions on the surface of the outermost layer. The protrusions formed by the particles B improve the running ability at high speed of the film. The surface of the outermost layer reinforced by the particles A can strongly hold the particles B and the formed protrusions, and therefore, the abrasion resistance of the particles B and the formed protrusions can be increased as well as the abrasion resistance of the surface itself can be increased by the reinforcement by the particles A.

Since the particles A mainly function to protect the surface of the outermost layer as described above, the particles A contained in the outermost layer are preferred to be concentrated particularly near the surface layer of the outermost layer. By such a concentration of the particles A, the surface of the film is effectively protected, and the advantage due to the containing of the particles A becomes remarkable. In the present invention, particle density ratio at surface layer is used as an index which quantitatively indicates at what degree the particles A are concentrated near the surface layer of the outermost layer. The method for determining the particle density ratio at surface layer is described later. When the particle density ratio at surface layer is not less than 0.01, the above advantage due to the containing of the particles A becomes remarkable. Therefore, the particle density ratio at surface layer of particles A in the outermost layer must be not less than 0.01 in the present invention. The particle density ratio at surface layer is preferably not less than 0.02. When the film is used as the base film of a magnetic recording media, good electromagnetic conversion property and output property can be obtained by controlling the particle density ratio at surface layer to be not less than 0.01.

In the biaxially oriented laminated film according to the present invention, the relationship between the mean primary particle size D of particles A and the thickness T of the outermost layer containing the particles A must satisfy the following equation.

$$D \leq T \leq 200D$$

If the thickness T is smaller than the particle size D, the force for holding the particles of the outermost layer becomes small and a high abrasion resistance cannot be obtained. If the thickness T is greater than 200D, the advantage for reinforcing the surface of the outermost layer becomes low and the abrasion resistance and the electromagnetic conversion property deteriorate. The abrasion resistance is increased as well as an excellent electromagnetic conversion property can be obtained when the film is used as the base film of a magnetic recording media, by controlling the relationship between the mean primary particle size D and the thickness T to the above range. More preferable range of the mean primary particle size D and the thickness T is $2D \leq T \leq 100D$.

The content of particles A is preferably in the range of 0.01 to 2% by weight, and more preferably in the range of 0.02 to 1% by weight. If the content is less than 0.01% by weight, the advantage for reinforcing the surface of the outermost layer expected cannot be obtained because the density of the particles in the layer becomes too low. If the content is greater than 2% by weight, the content is too much and the layer is likely to become brittle.

The particles A are preferably selected from the group consisting of zirconia, chain-like silica and alumina particles. The surface of the outermost layer is effectively reinforced by this selection of the material of the particles A. The mean primary particle size of the particles A is preferably in the range of 1 to 300 nm, and more preferably in the range of 5 to 100 nm. If the mean primary particle size is less than 1 nm, the advantage for reinforcing the surface of the outermost layer becomes low. If the mean primary particle size is greater than 300 nm, the particles A themselves form protrusions on the surface and the abrasion resistance is liable to deteriorate.

The particles A are preferred to be aggregated to some extent from the viewpoint of reinforcement of the surface. Namely, when the ratio of the mean secondary particle size E/the mean primary particle size D of the particles A is the range of 2 to 60, the surface of the outermost layer is effectively reinforced. If the particles A is in a condition of monodispersion or near the condition, i.e., the ratio of the mean secondary particle size E/the mean primary particle size D is less than 2, the advantage for reinforcing the surface of the outermost layer due to the aggregation of the particles A almost cannot be expected. If the ratio is greater than 60, the aggregated particles become too big and the aggregated particles form brittle protrusions, thereby deteriorating the abrasion resistance.

The particles A also can function as seeds for forming non-incorporated particles. Non-incorporated particles are particles that are internally formed in the polymer by, for example, controlling the amount of a catalyst (for example, Mg, Li, P) and generating a metal salt thereof as a part of the process of polymerization. Therefore, non-incorporated particles of which seeds are the particles A may be formed in the outermost layer and fine protrusions may be formed on the surface of the layer by the non-incorporated particles.

The mean particle size of particles B is preferably in the range of 0.1 to 2 $\mu$m, and more preferably in the range of 0.3 to 1 $\mu$m. If the particle size is less than 0.1 $\mu$m, the height of the protrusions formed on the surface becomes too small and a good running ability cannot be obtained because the reduction of the friction coefficient of the surface due to the protrusions is small. If the particle size is greater than 2 $\mu$m, the height of the protrusions formed on the surface becomes too large and the abrasion resistance of the surface deteriorates.

When the particles B are contained in at least one outermost layer of the laminated film, the particles B form protrusions on the surface of the outermost layer. In order to form desired protrusions on the surface of the outermost layer by particles B, the mean particle size of the particles B and the thickness of the layer containing the particles B must be relatively specified to a particular relationship. In the present invention, the relationship between the mean particle size D1 of the particles B and the thickness T of the layer containing the particles B is preferably determined so as to satisfy the equation; $0.5D1 \leq T \leq 5D1$. The protrusions having uniform and desired height can be formed by the particles B by controlling so as to satisfy the above equation. The electromagnetic conversion property as well as the abrasion resistance of the surface can be further increased by this formation of the uniform and desired protrusions.

The content of the particles B in the outermost layer is preferably in the range of 0.005 to 5% by weight, and more preferably in the range of 0.01 to 1.5% by weight. If the content is less than 0.005% by weight, the degree of the roughening of the surface due to the particles B is flat, the surface is likely to be scratched because the friction coefficient of the surface becomes high, and the abrasion resistance deteriorates. If the content is greater than 5% by weight, the content is too much, the outermost layer itself becomes brittle and is liable to be abraded, and the abrasion resistance also deteriorates.

Since the particles B mainly function to form protrusions on the surface of the outermost layer, the distribution of the particle size of the particles B must be appropriately restricted in order to control the height of the formed protrusions as uniform as possible. Namely, the distribution of the particle size of the particles B is preferably a sharp distribution, and the relative standard deviation of the distribution is preferably not greater than 0.6.

The particles B are preferably selected from the group consisting of calcium carbonate particles, crosslinked polymer particles and colloidal silica particles. The protrusions to be hardly abraded can be efficiently formed on the surface by these specified materials of the particles B. Among these materials, vaterite-type calcium carbonate is high in affinity with polyester etc. because of its high activity. Particularly in the present invention, the uniform quality, the uniform particle size and the high affinity with polyester etc. of vaterite-type calcium carbonate particles are effectively utilized, and the protrusions having a desired height and hardly abraded can be formed by the vaterite-type calcium carbonate particles. Crosslinked polymer particles also can be easily formed to have a uniform particle size, and they have a high affinity with the film matrix of polyester etc. As more concrete materials of the crosslinked polymer particles, crosslinked polystyrene and crosslinked divinylbenzene etc. can be employed.

In the biaxially oriented laminated film according to the present invention, particles C having a mean particle size greater than that of the particles A and smaller than that of the particles B may be added in the outermost layer containing the particles A and the particles B. The particles C form protrusions on the surface of the outermost layer which are lower in height than those formed by particles B. The particles C enhance the effect for toughening the surface to decrease the friction coefficient of the surface, and function to further improve the running ability at high speed of the film.

The particles C are preferably selected from the group consisting of colloidal silica particles, crosslinked polymer particles and vaterite-type calcium carbonate particles. Since the particle size of the particles of such materials is relatively easily made uniform, protrusions are formed on the surface such that the protrusions formed by the particles having a uniform particle size supplement the protrusions formed by the particles B. Namely, relatively high protrusions are formed by the particles B, and the protrusions are formed by the particles C so as to supplement the protrusions formed by the particles B, i.e., so as to be positioned between the protrusions formed by the particles B or on the protrusions formed by the particles B. As a result, the surface is toughened more uniformly without forming too big protrusions, the friction coefficient of the surface is greatly decreased and an excellent running ability can be obtained. Moreover, since the particles C of such materials have a high affinity with the film matrix of polyester etc., the particles C also can reinforce the protrusions formed by the particles B.

The mean particle size of particles C is preferably in the range of 0.05 to 1.5 μm, and more preferably in the range of 0.1 to 1 μm. If the particle size is less than 0.05 μm, the height of the protrusions formed on the surface becomes too small and the advantage for improving the running ability is small. If the particle size is greater than 1.5 μm, a part of the protrusions formed by the particles C are higher than the protrusions formed by the particles B and the abrasion resistance of the surface may deteriorates.

The content of the particles C in the outermost layer is preferably in the range of 0.005 to 2% by weight, and more preferably in the range of 0.01 to 1.5% by weight. If the content is less than 0.005% by weight, the advantage for improving the running ability cannot be expected because the number of the protrusions formed by the particles C is too small. If the content is greater than 2% by weight, the number of the particles is too great, the outermost layer itself becomes brittle and the particles are likely to be dropped out.

Since the particles C mainly function to enhance to roughen the surface by forming relatively small protrusions without damaging the formation of the protrusions by particles B, the particle size of the particles C is desirably as uniform as possible, that is, it is desired that there are no too big protrusions. For this, the distribution of the particle size of the particles C is preferably restricted appropriately. Namely, the distribution of the particle size of the particles C is preferably a sharp distribution, and the relative standard deviation of the distribution is preferably not greater than 0.6.

In the laminated film according to the present invention, the relative standard deviation of height distribution of protrusions on at least one surface of the film is preferably not greater than 1.2, and more preferably not greater than 1.1. If the relative standard deviation is greater than the above value, undesired too big protrusions are intermixed between desired protrusions, and the electromagnetic conversion property as well as the abrasion resistance may deteriorate.

Further, in the biaxially oriented laminated film according to the present invention, the surface resistivity of at least one outermost layer of the laminated film is preferably not greater than $1 \times 10^{14} \Omega/\square$, more preferably not greater than $1 \times 10^{13} \Omega/\square$, and further more preferably not greater than $1 \times 10^{9} \Omega/\square$. Since the surface resistivity is controlled in the above range, the electro static charge during running is suppressed small, the running ability of the film is further increased, and shaking of regenerated image can be prevented when the laminated film is used as the base film of a magnetic recording media.

In order to satisfy the above surface resistivity, at least one outermost layer of the laminated film preferably contains sulphate represented by the chemical formula [$C_nH_{2n+1}$—$C_6H_4$—$SO_3M$] (n=6—30, M=Na, Li). "n" is preferably in the range of 9 to 18. M is preferably Na. [—$C_6H_4$—] is benzene ring, and the combining position of [$SO_3M$] with the benzene ring is preferably para position although ortho or meta position is available. The content of sulphate is preferably in the range of 0.2 to 5% by weight from the viewpoint of increase of abrasion resistance and electromagnetic conversion property, and more preferably in the range of 0.5 to 2% by weight.

Further, in the biaxially oriented laminated film according to the present invention, the outermost layer may contain polyalkylene glycol from the viewpoint of increase of abrasion resistance and electromagnetic conversion property. Polyethylene glycol is preferable as the polyalkylene glycol. The molecular weight of polyalkylene glycol is preferably in the range of 100 to 10000, and more preferably in the range of 500 to 5000. The content of polyalkylene glycol is preferably in the range of 0.2 to 5% by weight from the viewpoint of increase of abrasion resistance and electromagnetic conversion property, and more preferably in the range of 0.5 to 2% by weight.

The intrinsic viscosity (IV) of the polymer of the outermost layer of the laminated film according to the present invention is preferably in the range of 0.4 to 0.9 because the abrasion resistance is further increased.

In the laminated film according to the present invention, other polymers may be blended as long as the objects of the present invention are not injured. Further, a generally used additive, for example, oxidation inhibitor, thermal stabilizer, lubricant, ultraviolet absorbent etc., may be added by the volume which does not substantially decrease the advantages according to the present invention.

In the laminated film according to the present invention, parameter P10 of the surface roughness of at least one outermost layer is preferably not greater than 250 nm. If the parameter P10 is greater than this value, the abrasion resistance is likely to be decreased as well as the electromagnetic conversion property is likely to be decreased. More preferable range of the parameter P10 is not greater than 200 nm.

In a case where the laminated film according to the present invention has four or more layers, the laminated film can have a lamination structure of, for example, an outermost layer A containing particles A/a cover layer B/an intermediate layer C/another layer D, or layer A/layer B/layer C/layer B/layer D. The thickness of the cover layer B may be appropriately set within the range of not less than 0.2 μm depending upon the condition of the intermediate layer C. Namely, since the layer B functions as a smoothing layer against the layer C for the layer A, the thickness of the layer B can be set depending upon uses as long as the smoothness effect can be obtained. For example, the thickness can be set appropriately large for use of floppy disk etc., and appropriately small for use of magnetic tape etc. However, if the thickness is less than 0.2 μm, the advantage to be expected cannot be obtained.

Although it is not necessary that the layer B contains particles, it is preferred that the layer B contains particles in the range of 0 to 2% by weight because the layer B itself can be reinforced by the particles contained. In such a case, the kind of the contained particles may be the same as or different from that of the particles contained in the layer A.

The intermediate layer C substantially constitutes a center layer of the biaxially oriented laminated film according to the present invention. The thickness of the layer C may be appropriately set within the range of not less than 0.1 μm. For example, since both surfaces of the layer C are covered with layers B and the layer B functions as a smoothing layer for the layer A, the layer C may have a mechanical strength etc., at an appropriate level. Therefore, recycle polymer may be contained in this layer C. Where, "recycle polymer" means, for example, with respect to a polyester film, a polymer of which end carboxylic acid of polyester is not less than 55 equivalents/$10^6$ g and haze in the polymer is not greater than 18%.

Next, a process for producing the biaxially oriented laminated film according to the present invention will be explained. However, the process is not particularly restricted by the following one.

As the method for containing particles in polyester, for example, a method for dispersing the particles in ethylene glycol, which is the diol component of the polyester, in the form of a slurry, and thereafter copolymerizing the ethylene glycol with a dicarboxylic acid component, is preferable. When the particles are added, for example, the particles can be dispersed very well by adding the particles in the form of water sol or alcohol sol formed when copolymerized, as they are, i.e., without drying. By such a method for adding the particles, good abrasion resistance and electromagnetic conversion property can be obtained. Alternatively, a method for blending the water sol of the particles directly with polyester pellets and mixing the particles with the polyester by supplying the blended water sol and the polyester pellets to a twin-screw extruder is also very effective to obtain the advantages aimed in the present invention. As the method for controlling the content of the particles, a method for making master pellets having a high concentration by the above method and diluting the master pellets with polyester which substantially does not contain particles when the film is produced is effective.

Next, a laminated polyester film having three or more layers is produced using the above polyester pellets. The polyester pellets prepared by the above method are blended with other pellets at a predetermined rate, and the blended pellets are supplied to a known extruding apparatus for melting and lamination after the pellets are dried. The molten polymer is delivered out from a die in the form of a sheet, and the sheet is cooled and solidified on a casting roll to form a non-stretched film. Namely, the lamination is carried out by using two or more extruders and a die having a composite manifold or a feed block for three or more layers (for example, a feed block having a rectangular shaped lamination portion), a molten sheet having three or more layers is delivered out from a die, the delivered sheet is cooled on a casting roll to form a non-stretched film. In such a manner, it is effective to install a static mixer and a gear pump in the polymer path. Further, it is effective to set the temperature of the extruder for extruding the polymer constituting the outermost layer to a temperature lower by 5° to 10° C. than the temperature of the extruder for extruding the polymer constituting the inner layers.

Next, the non-stretched film obtained is biaxially stretched and biaxially oriented. As the stretching process, a sequential biaxial stretching or a simultaneous biaxial stretching can be employed. Especially, a process for using a sequential biaxial stretching wherein firstly longitudinal stretching and secondly transverse stretching are carried out, dividing the longitudinal stretching into three or more stages and setting the total draw ratio of the longitudinal stretching to 3.0 to 6.5 times is particularly preferable. Although it is difficult to determine the optimum temperature for the longitudinal stretching to a particular temperature because the optimum temperature varies depending on the kind of polyester, usually setting the temperature of the first stage to 50° to 130° C. and the temperatures of other stages after the first stage to a higher temperature is effective. The stretching rate in the longitudinal direction is preferably in the range of 5000 to 50000%/min. The transverse stretching is usually conducted by using a stenter. The stretching rate in the transverse direction is preferably in the range of 1000 to 20000%/min, and the temperature for the stretching is preferably in the range of 80° to 160° C. The biaxially stretched film thus formed is then heat treated. The temperature of the heat treatment is preferably in the range of 170° to 220 ° C., more preferably in the range of 180° to 200° C., and the time of the heat treatment is preferably in the range of 0.2 to 20 seconds.

Next, methods for determining the characteristics in the present invention and estimating the effects according to the present invention will be explained.

(1) Mean primary particle size of particles:

The film containing particles is cut in its thickness direction to make a very thin piece having a thickness of 1000 to 8000 Å, and the piece is observed by using a transmission type electron microscope ( for example, JEM-1200EX produced by Nippon Denshi Corporation). When the piece is observed at a magnification of about 100,000 times, a minimum particle size (a primary particle size), into which the observed particles cannot be further divided, can be observed. This observation is carried out on 100 fields of view, and the mean value is defined as the mean primary particle size of the particles. Alternatively, the specific surface area of the particles is determined by using BET adsorption isotherm, the particle size is determined from the determined specific surface area by using the following equation when the shape of the particles is assumed to be spherical, and the determined particle size may be defined as the mean primary particle size of the particles. Particle size=6/(Density of particle×Specific surface area)

(2) Secondary particle size of particles:

Particles are dispersed in ethylene glycol or water to make a slurry, the particle size distribution of the slurry is determined by using a decanter type particle size measuring apparatus, and the mean particle size determined from the determined particle size distribution is defined as the secondary particle size of the particles. Alternatively, the equivalent diameter of the particles is determined from the above (1), and the mean equivalent diameter may be defined as the secondary particle size of the particles.

(3) Relative standard deviation of distribution of particle size of particles B:

The primary particle sizes of 1000 particles B are determined in the manner described in the above (1), and the relative standard deviation of the distribution of particle size is determined by the following equation. Relative standard deviation of distribution of particle size=Standard deviation/mean particle size (4) Particle density ratio at surface layer:

The ratio of the density of the element originating from the particles contained in the film to the density of the carbon in the polyester determined by using secondary ion mass spectrum (SIMS) is defined as the particle density, and the analysis is carried out along the direction of thickness of the film. The ratio A/B of the particle density A at the outermost point (at a depth of 3 nm) measured by SIMS to the particle density B at a depth of 30 nm measured by continuing the SIMS analysis along the direction of thickness of the film is defined as the particle density ratio at surface layer. In this determination, if impurities are contained in the film, the density ratio with the elements of the impurities is sometimes detected together with the above analysis. However, this density ratio originating from the impurities should be neglected on the analysis. The measuring apparatus and the measuring conditions are as follows:

① Measuring apparatus:
Secondary ion mass spectrum analysis apparatus; A-DIDA3000 produced by ATOMIKA (Germany)

② Measuring conditions:
Primary ion species; $O_2^+$
Primary ion acceleration voltage; 12 KV
Primary ionic current; 75 nA
Raster area; 800 μm □
Analysis area; gate 100%
Degree of vacuum for measurement; $1\times10^{-8}$ Torr
E-GUN; 0.5KV-3.0KV (5) Content of particles:

The film is treated with a solvent which dissolves the polyester but which does not dissolve the particles, and the particles are separated from the polyester by centrifugation. The content of the particles is defined as the ratio of the weight of the separated particles to the total weight of the film (% by weight). Alternatively, as needed, the determination may be carried out by utilizing thermal decomposition, infrared spectrophotometry, fluorescent X-ray diffraction, Raman scattering or SEM-XMA. The contents of the particles of the laminated layer and the base layer can be distinguished from each other by cutting off the laminated layer. Furthermore, if necessary, the content may be determined by calculating the number of the particles in each section observed by using TEM.

(6) Relative standard deviation of height distribution of protrusions:

The signal of the data of the height of the protrusions measured by using a two beam and two detector type scanning electron microscope (ESM-3200; produced by Elionics Corporation) and a cross section measuring apparatus (PMS1; produced by Elionics Corporation) and by scanning these apparatus under a condition that the height of the flat portion of the surface of the film is set as zero is sent to an image processor (IBAS-2000; produced by Elionics Corporation), and the image of the protrusions of the film surface is reconstructed on the display of the image processor. Then, the highest value among the heights of the projected portions of each protrusion, which are determined by placing the protrusion in the image of the image processor in a binary condition, is defined as the height of the protrusion. This measurement is repeated 500 times changing the area to be observed, and the mean height thereof and the standard deviation thereof are determined. The magnification of the scanning electron microscope is selected from the range of 1000 to 8000 times. The relative standard deviation of height distribution of the protrusions is determined by the following equation.

Relative standard deviation=standard deviation/mean height (7) Surface resistivity of film:

The film to be determined is placed on a relatively thick rubber sheet so that the measuring surface is at the upper side. A pair of rectangular electrodes of brass having a length equal to the length of a side of a square and a width of 1/10 of the length, whose bottom surfaces are polished in plane, are placed on the film such that the electrodes are positioned just at the sides of the square opposite to each other. While a pressure of 0.2 kg/cm$^2$ is applied on the electrodes, the electrical resistivity between the electrodes is measured as the surface resistivity of the film. In this measurement, the size of the electrodes may be appropriately selected depending upon the film to be determined. The unit of the surface resistivity is $\Omega/\square$.

(8) Identification and Content of sulphate:

The composition and the content of the sulphate contained in the laminated layer is determined by ashing treatment or infrared absorption spectrum.

(9) Identification and content of polyalkylene glycol:

The composition and the content of the polyalkylene glycol contained in the laminated layer is determined by thermal decomposition treatment and mass spectrum or infrared absorption spectrum.

(10) Thickness of layer:

The ratio of the density of the element originating from the particles contained at the highest density in the film to the density of the carbon in the polyester (M+/C+) determined by using secondary ion mass spectrum (SIMS) is defined as the particle density, and the analysis is carried out along the direction of thickness of the outermost layer. The particle density in the outermost layer increases as distanced from the surface because the surface constitutes a boundary surface. In the film according to the present invention, the particle density becomes the maximum at a depth [I] and thereafter decreases again. Based on this particle density curve, a depth [II], at which the particle density becomes half of the maximum value, is defined as the thickness of the outermost layer (where, [II]>[I]). In a case where the particles contained at the highest density in the film is inorganic particles, because the determination by SIMS is difficult, the thickness of the outermost layer may be determined by measuring the depth profile of the particle density by X-ray photoelectron spectrum (XPS), infrared spectroscopic analysis (IR) or a confocal microscope while etching from the surface, and determining in a manner similar to the above-described manner. Further, the thickness may be determined by observing the cross section of the film or using a level difference measuring apparatus for thin membranes.

(11) Parameter of surface roughness P10:

Using a photo-interference type three-dimensional surface analysis apparatus (TOPO-3D; produced by WYKO Corporation, objective lens; 40–200 times, use of a high resolution camera is effective), the image of the protrusions of the film surface is constructed on the display of an image processor. The mean value of ten points from the highest protrusion in the constructed image is defined as P10. The measurement is repeated twenty times and the mean value thereof is defined as the parameter of surface roughness P10 (unit: nm).

(12) Intrinsic viscosity of polymer (IV):

The intrinsic viscosity of polymer is determined using o-chlorophenol as the solvent.

(13) Haze:

Polyester 100 mg is soluted in mixture solvent 10 ml of phenol/tetrachloromethanol (6/4 ratio by weight) and haze of polymer solution is measured by ASTM-D-1003-52.

(14) Quantity of carboxyl end group:

In accordance with the method of Maurice.

Polymer 2 g is soluted in mixture solvent 50 ml of o-cresol/chlorofolm (7/3 ratio by weight) and quantity of carboxyl end group is titrated by N/20-NaOH methanol solution. Quantity of carboxyl end group is shown in volue of equivalent/polyester 10$^6$ g.

(15) Shaking of regenerated image when the film is used as a base film of a magnetic recording media:

A magnetic coating solution is coated with a gravure roll on the surface of the film so that the thickness after drying is 3 μm. The composition of the magnetic coating solution is as follows. by weight.)

Co-containing iron oxide: 100 parts
Vinyl chloride/vinyl acetate copolymer: 10 parts
Polyurethane elastomer: 10 parts
Polyisocyanate: 5 parts
Lecitin: 1 parts
Methylethylketone: 75 parts
Methylisobutylketone: 75 parts
Toluene: 75 parts
Carbon black: 2 parts
Lauric acid: 1.5 parts After the above composition is blended and dispersed for 48 hours by a ball mill, a curing agent is added by 6 parts. The mixture obtained is filtrated by a filter to prepare the magnetic coating solution. The magnetic coating solution is coated on the film and the coated magnetic layer is magnetically oriented and dried at 110° C. After calendering the film by a small test calendering machine (steel roll/nylon roll; 5 stages) at a temperature of 70° C. and a pressure of 200 kg/cm, the film is wound in the form of a roll. The film roll is cured at 50° C. for 48 hours, and thereafter, the film is slit to make a magnetic tape having a width of ½ inch.

The magnetic tape thus obtained is incorporated into a VTR cassette, and using a domestic video tape recorder, an image of vertical lines is recorded in an atmosphere of 40° C. and 80% RH. The image recorded in the tape is regenerated in the same atmosphere using the VTR. The degree of shaking of the regenerated image of vertical lines after 60 minutes from the start of the regeneration is estimated by observation. If there is no shaking, the shaking of regenerated image is determined to be good, and if the shaking can be recognized, the shaking of regenerated image is determined to be not good.

(16) Electromagnetic conversion property:

100% chromatic signal generated by a television testing wave generator is recorded in the tape described in the above (15) using a domestic VTR, and chromatic S/N is determined from the regenerated signal using a color video noise measuring apparatus (unit: dB).

(17) Abrasion resistance:

The film is slit into a tape having a width of ½ inch. The tape is run by 200 m under a condition where a safety razor is pressed onto the tape so that the knife edge is positioned lower by 0.5 mm than the level of the tape applied with a tension (running speed: 200 m/min, tension: 100g). The height of the powder on the razor, which is cut off from the tape by the razor and adhered to the razor, is determined by a microscope, and the height is defined as the abraded amount ($\mu$m). If the abraded amount is not greater than 180 $\mu$m, the abrasion resistance is good, and if the abraded amount is greater than 180 $\mu$m, the abrasion resistance is not good.

(18) Tracking resistance:

A signal is recorded in a floppy disk under a condition of a temperature of 25° C. and a relative humidity of 20%, and the condition is maintained at 25° C. and a relative humidity of 70%. The output envelopes of under the condition of 25° C. and 20% RH and under the condition of 25° C. and 70% RH are compared. The smaller the difference between both output envelopes, the more excellent is the tracking resistance. If the difference is greater than 3 dB, the tracking resistance is determined to be not good, and if the difference is not greater than 3 dB, the tracking resistance is determined to be excellent.

(19) Durability:

The same track recorded in the floppy disk in the same manner as that of the above (16) is scanned at a running speed of 6 m/sec not less than 1000,000 times, and thereafter, the output envelope is determined. If scratches are recognized on the magnetic surface and the output envelope is instable, the durability is estimated to be not good. If no scratches are recognized on the magnetic surface and the output envelope is stable, the durability is estimated to be excellent.

EXAMPLES AND COMPARATIVE EXAMPLES

Preferred examples will be hereinafter explained together with comparative examples.

EXAMPLE 1 (TABLE 1)

Zirconia particles having a mean primary particle size of 20 nm prepared as particles A were dispersed in ethylene glycol using glass beads having a diameter of 50 $\mu$m as media. After removing the glass beads, the mixture was polymerized with terephthalic acid to make master pellets of polyethylene terephthalate.

On the other hand, vaterite-type calcium carbonate particles having a mean primary particle size of 0.8$\mu$m prepared as particles B were dispersed uniformly in ethylene glycol using the above media dispersion method, and master pellets containing particles B were prepared in a manner similar to that described above.

The above master pellets containing particles A, the master pellets containing particles B and pellets of polyethylene terephthalate which did not contain particles were blended such that the contents of particles A and particles B were 0.3 wt % and 0.4 wt %, respectively. The blended pellets were supplied to a vent-type twin-screw extruder and molten at a temperature of 280° C. (polymer I). Further, another extruder was prepared, the pellets with no particles were dried at a temperature of 180° C. for 8 hours (3 Torr), the dried pellets were supplied to the extruder and molten at a temperature of 290° C. (polymer II). After filtering these two polymers at a high accuracy in filtration degree, the polymers were laminated by a feed block for three layers having a rectangular shaped lamination portion so that the polymer II was positioned as the base layer and the polymer I was laminated on both surfaces of the base layer as both outermost layers. The laminated polymer was delivered out from a fish tail type die in the form of a sheet, the delivered sheet was cast on a casting drum of which surface temperature was controlled at 30° C. and cooled and solidified on the drum using an electrostatic charging method to form a non-stretched film having a thickness of about 160 $\mu$m. In this casting, the draft ratio was 6.5.

The non-stretched film obtained was stretched in the longitudinal direction at three stages the respective conditions of temperatures and draw ratios of which were 123° C., 1.2 times; 126° C., 1.45 times; and 114 ° C., 2.3 times. The uniaxially stretched film obtained was stretched, using a stenter, in the transverse direction at two stages the respective conditions of temperatures and draw ratios of which were 111° C. 3.7 times and 113 ° C., 1.2 times, and heat treated at conditions of a temperature of 200° C. and a constant length for five seconds to make a biaxially oriented film having a thickness of 13 $\mu$m. The thickness T of the outermost layer was 1.0 $\mu$m and the relationship between the thickness T and the particle size D of particles A was T=50D. The particle densities of particles A and the lamination thicknesses of both outermost layers were the same, and the particle density ratio at surface layer was 0.06.

The electromagnetic conversion property of the film was 2.6 dB in chromatic S/N. The abrasion resistance was 55 $\mu$m and it was good. Thus, in a case where the kind, the particle size, the content, the particle density ratio at surface layer and the relationship between the thickness T and the particle size D in the outermost layer satisfy the range according to the present invention, a film having an excellent electromagnetic conversion property and a good abrasion resistance.

EXAMPLES 2–4, COMPARATIVE EXAMPLES 1–4 (TABLE 1)

Biaxially oriented laminated films were made in the similar manner to that of Example 1, changing the kind, the particle size, the content, the particle density ratio at surface layer and the relationship between the thickness T and the particle size D in the outermost layer. If any of these conditions is out of the range according to the present invention, both of an excellent electromagnetic conversion property and a good abrasion resistance cannot be achieved.

TABLE 1

| | Particle A | | | | | Particle B | |
|---|---|---|---|---|---|---|---|
| | Kind | Primary particle size (nm) | Secondary/Primary particle size | Content (wt %) | Particle density ratio at surface layer | Kind | Primary particle size ($\mu$m) |
| Example 1 | zirconia | 20 | 10 | 0.3 | 0.06 | vaterite-type calcium carbonate | 0.8 |
| Example 2 | alumina | 10 | 20 | 0.5 | 0.07 | Crosslinked polymer particle | 0.6 |
| Example 3 | silica | 40 | 8 | 0.2 | 0.03 | vaterite- | 0.4 |

TABLE 1-continued

| | | | | | | type calcium carbonate | |
|---|---|---|---|---|---|---|---|
| Example 4 | silica | 40 | 4 | 0.5 | 0.03 | Crosslinked polymer particle | 0.5 |
| Comparative Example 1 | — | — | — | — | — | vaterite-type calcium carbonate | 0.8 |
| Comparative Example 2 | zirconia | 20 | 10 | 0.3 | 0.06 | — | — |
| Comparative Example 3 | zirconia | 40 | 6 | 0.5 | 0.005 | silica | 0.6 |
| Comparative Example 4 | silica | 150 | 1 | 0.1 | 0.002 | vaterite-type calcium carbonate | 0.5 |

| | Particle B | | Thickness of outermost layer ($\mu$m) | Electromagnetic conversion property (dB) | Abrasion resistance ($\mu$m) |
|---|---|---|---|---|---|
| | Content (wt %) | Relative standard deviation of distribution of particle size | | | |
| Example 1 | 0.4 | 0.5 | 1.0 | +2.6 | 55 |
| Example 2 | 0.3 | 0.2 | 1.2 | +2.3 | 75 |
| Example 3 | 0.5 | 0.5 | 0.7 | +2.4 | 80 |
| Example 4 | 0.2 | 0.2 | 0.7 | +2.2 | 60 |
| Comparative Example 1 | 0.5 | 0.5 | 5.0 | 0 | 350 |
| Comparative Example 2 | — | — | 5.0 | +0.5 | 250 |
| Comparative Example 3 | 0.4 | 0.8 | 5.0 | −0.5 | 300 |
| Comparative Example 4 | 0.002 | 0.5 | 3.0 | −0.4 | 400 |

EXAMPLE 5 (TABLE 2)

Zirconia particles having a mean primary particle size of 20 nm prepared as particles A were dispersed in ethylene glycol using glass beads having a diameter of 50 $\mu$m as media. After removing the glass beads, the mixture was polymerized with terephthalic acid to make master pellets of polyethylene terephthalate.

On the other hand, calcium carbonate particles having a mean primary particle size of 0.8 $\mu$m prepared as particles B were dispersed uniformly in ethylene glycol using the above media dispersion method, and master pellets containing particles B were prepared in a manner similar to that described above.

Further, colloidal silica particles having a mean primary particle size of 0.4 $\mu$m prepared as particles C were dispersed uniformly in ethylene glycol using the above media dispersion method, and master pellets containing particles C were prepared in a manner similar to that described above.

The above master pellets containing particles A, the master pellets containing particles B, the master pellets containing particles C and pellets of polyethylene terephthalate which did not contain particles were blended such that the contents of particles B and particles C were 0. 4 wt % and 0.1 wt %, respectively. The blended pellets were supplied to a vent-type twin-screw extruder and molten at a temperature of 280° C. (polymer I). Further, another extruder was prepared, the pellets with no particles were dried at a temperature of 180° C. for 8 hours (3 Torr), the dried pellets were supplied to the extruder and molten at a temperature of 290° C. (polymer II). After filtering these two polymers at a fine mesh in filtration degree, the polymers were laminated by a feed block for three layers having a rectangular shaped lamination portion so that the polymer II was positioned as the base layer and the polymer I was laminated on both surfaces of the base layer as both outermost layers. The laminated polymer was delivered out from a fish tail type die in the form of a sheet, the delivered sheet was cast on a casting drum of which surface temperature was controlled at 30° C. and cooled and solidified on the drum using an electrostatic charging method to form a non-stretched film having a thickness of about 160 $\mu$m. In this casting, the draft ratio was 6.5.

The non-stretched film obtained was stretched in the longitudinal direction at three stages the respective conditions of temperatures and draw ratios of which were 123° C., 1.2 times; 126° C., 1.45 times; and 114 ° C., 2.3 times. The uniaxially stretched film obtained was stretched, using a stenter, in the transverse direction at two stages the respective conditions of temperatures and draw ratios of which were 111° C. 3.7 times and 113 ° C., 1.2 times, and heat treated at conditions of a temperature of 200° C. and a constant length for five seconds to make a biaxially oriented film having a thickness of 13 $\mu$m. The thickness T of the outermost layer was 1.0 $\mu$m and the relationship between the thickness T and the particle size D of particles A was T=50D.

The electromagnetic conversion property of the film was 2.3 dB in chromatic S/N. The abrasion resistance was 35 $\mu$m and it was good. Thus, in a case where the kind, the particle size, the content and the relationship between the thickness T and the particle size D in the outermost layer satisfy the range according to the present invention, a film having an excellent electromagnetic conversion property and a good abrasion resistance.

EXAMPLES 6-8, COMPARATIVE EXAMPLES 5-8 (TABLE 2)

Biaxially oriented laminated films were made in the similar manner to that of Example 5, changing the kind, the particle size, the content and the relationship between the thickness T and the particle size D in the outermost layer. If any of these conditions is out of the range according to the present invention, both of an excellent electromagnetic conversion property and a good abrasion resistance cannot be achieved.

TABLE 2

| | Particle A | | Particle B (Calcium carbonate) | | Particle C | |
|---|---|---|---|---|---|---|
| | Kind | Primary particle size (nm) | Secondary/ Primary particle size | Particle size (μm) | Content (wt %) | Kind | Particle size (μm) |
| Example 5 | zirconia | 20 | 7 | 0.8 | 0.4 | Colloidal silica | 0.4 |
| Example 6 | chain-like silica | 20 | 10 | 0.6 | 0.4 | Colloidal silica | 0.5 |
| Example 7 | alumina | 10 | 10 | 0.5 | 0.3 | Crosslinked polymer particle | 0.6 |
| Example 8 | zirconia | 40 | 5 | 0.5 | 0.5 | vaterite-type calcium carbonate | 0.5 |
| Comparative Example 5 | — | — | — | 0.6 | 0.4 | Colloidal silica | 0.4 |
| Comparative Example 6 | alumina | 10 | 10 | — | — | Colloidal silica | 0.4 |
| Comparative Example 7 | alumina | 10 | 20 | 0.6 | 0.4 | — | — |
| Comparative Example 8 | zirconia | 20 | 10 | 0.6 | 3.0 | vaterite-type calcium carbonate | 0.8 |

| | Particle C | | Thickness of outermost layer (μm) | Electromagnetic conversion property (dB) | Abrasion resistance (μm) |
|---|---|---|---|---|---|
| | Content (wt %) | Relative standard deviation of distribution of particle size | | | |
| Example 5 | 0.1 | 0.5 | 1.0 | +2.3 | 35 |
| Example 6 | 0.2 | 0.3 | 1.5 | +2.5 | 70 |
| Example 7 | 0.2 | 0.5 | 0.7 | +2.9 | 80 |
| Example 8 | 0.3 | 0.3 | 1.0 | +2.1 | 65 |
| Comparative Example 5 | 0.1 | 0.5 | 3.0 | 0 | 250 |
| Comparative Example 6 | 0.1 | 0.5 | 3.0 | −0.2 | 320 |
| Comparative Example 7 | — | — | 5.0 | −0.4 | 280 |
| Comparative Example 8 | 0.002 | 1.0 | 5.0 | +0.2 | 240 |

EXAMPLE 9 (TABLE 3)

Chain-like silica particles having a mean primary particle size of 10 nm and calcium carbonate particles were dispersed in ethylene glycol using glass beads having a diameter of 50 μm as media. After removing the glass beads, the mixture was polymerized with terephthalic acid to make master pellets of polyethylene terephthalate. The content of the particles in the polyester was each 1.0% by weight.

The above master pellets containing the particles of 30 parts by weight and pellets of polyethylene terephthalate with no particles of 70 parts by weight were blended, and the blended pellets were supplied to a vent-type twin-screw extruder 1 and molten at a temperature of 280° C. (polymer I). Further, another extruder 2 was prepared, after the master pellets containing the particles of 10 parts by weight and pellets of polyethylene terephthalate with no particles of 90 parts by weight were blended, the blended pellets were dried at a temperature of 180° C. for 8 hours (3 Torr), and the dried pellets were supplied to the extruder and molten at a temperature of 290° C. (polymer II). Furthermore, another extruder 3 was prepared, after recycle chip of 30 parts by weight and pellets of polyethylene terephthalate with no particles of 70 parts by weight were blended, the blended pellets were dried at a temperature of 180° C. for 8 hours (3 Torr), and the dried pellets were supplied to the extruder and molten at a temperature of 290° C. (polymer III). After filtering these three polymers at a fine mesh in filtration degree, the polymers were laminated by a feed block for five layers having a rectangular shaped lamination portion so that the polymer III was positioned as the center layer, the polymer II was laminated on both surfaces of the center layer as cover layers and the polymer I was laminated on the surfaces of both cover layers as the outermost layers. The laminated polymer was delivered out from a fish tail type die in the form of a sheet, the delivered sheet was cast on a casting drum of which surface temperature was controlled at 30° C. and cooled and solidified on the drum using an electrostatic charging method to form a non-stretched film having a thickness of about 160 μm. In this casting, the draft ratio was 6.5.

The non-stretched film obtained was stretched in the longitudinal direction at three stages the respective conditions of temperatures and draw ratios of which were 123° C., 1.2 times; 126° C., 1.45 times; and 114° C., 2.3 times. The uniaxially stretched film obtained was stretched, using a stenter, in the transverse direction at two stages the respective conditions of temperatures and draw ratios of which were 111° C. 3.7 times and 113° C., 1.2 times, and heat treated at conditions of a temperature of 200° C. and a constant length for five seconds to make a biaxially oriented film having a thickness of 15 μm. The thickness T of the outermost layer was 1.0 μm and the relationship T/D between the thickness T and the particle size D of the particles was 100. The particle densities of the particles and the lamination thicknesses of both outermost layers were the same. The intrinsic viscosity (IV) of the polymer of the outermost layers was 0.615. The parameter of surface roughness P10 of this film was 100 nm.

The electromagnetic conversion property of the film was 2.0 dB in chromatic S/N. The abrasion resistance was 90 μm and it was good. Thus, in a case where the particle size, the content of the particles and the thickness of each layer satisfy the range according to the present invention, a film having an excellent electromagnetic conversion property and a good abrasion resistance.

EXAMPLES 10-12, COMPARATIVE EXAMPLES 9-14 (TABLE 3)

Biaxially oriented laminated films were made in the similar manner to that of Example 9, changing the particle size, the content of the particles and the thickness of each layer. If any of these conditions is out of the range according to the present invention, both of an excellent electromagnetic conversion property and a good abrasion resistance cannot be achieved.

TABLE 3

| | Layer A | | | Layer B | | Layer C | |
|---|---|---|---|---|---|---|---|
| | Thickness (μm) | Thickness/ particle size | Content (wt %) | Thickness (μm) | Content (wt %) | Thickness (μm) | Recycle chip |
| Example 9 | 1.0 | 100 | 0.3 | 2.0 | 0.1 | 9.0 | O |
| Example 10 | 1.5 | 150 | 0.5 | 1.0 | 0 | 10.0 | O |
| Example 11 | 0.8 | 80 | 0.3 | 4.0 | 0.1 | 5.4 | O |
| Example 12 | 1.0 | 100 | 0.2 | 3.0 | 0.2 | 7.0 | O |
| Comparative Example 9 | 15 | 1500 | 0.2 | — | — | — | — |
| Comparative Example 10 | 5.0 | 500 | 0.3 | 10.0 | 0.4 | — | — |
| Comparative Example 11 | 5.0 | 500 | 0.5 | 9.0 | 0.2 | — | — |
| Comparative Example 12 | 3.0 | 300 | 0.2 | 10.0 | 0 | 3.0 | x |
| Comparative Example 13 | 0.8 | no chain-like silica | | 4.0 | 5.0 | 3.0 | x |
| Comparative Example 14 | 1.0 | no chain-like silica | | 0.1 | 3.0 | 12.0 | O |

| | Parameter of surface roughness P10 (nm) | Relative standard deviation of height distribution of protrusions | Electromagnetic conversion property (dB) | Abrasion resistance (μm) | Lamination structure |
|---|---|---|---|---|---|
| Example 9 | 100 | 0.5 | +2.0 | 90 | A/B/C/B/A (five layers) |
| Example 10 | 150 | 0.6 | +1.7 | 110 | A/B/C/B/A (five layers) |
| Example 11 | 120 | 0.6 | +1.8 | 85 | A/B/C/B (four layers) |
| Example 12 | 125 | 1.0 | +1.2 | 120 | A/B/C/B/A (five layers) |
| Comparative Example 9 | 320 | 1.1 | 0 | 250 | single layer |
| Comparative Example 10 | 190 | 1.2 | +0.2 | 220 | A/B (two layers) |
| Comparative Example 11 | 280 | 1.0 | +0.3 | 300 | A/B/A (three layers) |
| Comparative Example 12 | 200 | 1.2 | +0.5 | 190 | A/B/C (three layers) |
| Comparative Example 13 | 250 | 1.1 | +1.0 | 350 | A/B/C/B (four layers) |
| Comparative Example 14 | 300 | 1.2 | +0.2 | 190 | A/B/C/B/A (five layers) |

EXAMPLES 13 AND 14, COMPARATIVE EXAMPLE 15 (TABLE 4)

Biaxially oriented laminated films having relatively large thicknesses were made as base films of floppy disks in the similar manner to that of Example 9. A great smoothing effect could be obtained by layers B having a relatively large thickness, and a large amount of recycle chips could be contained in layer C having a large thickness. As shown in Table 4, in a case where each property is in the range according to the present invention, excellent tracking resistance and durability can be obtained, and it is understood that the biaxially oriented laminated film according to the present invention is an excellent film as a base material of a floppy disk.

TABLE 4

| | Layer A | | | Layer B | | Layer C | |
|---|---|---|---|---|---|---|---|
| | Thickness (μm) | Thickness/ particle size | Content (wt %) | Thickness (μm) | Content (wt %) | Thickness (μm) | Recycle chip |
| Example 13 | 1.0 | 100 | 0.3 | 10.0 | 0.1 | 53.0 | ◯ |
| Example 14 | 1.5 | 150 | 0.5 | 30.0 | 0 | 12.0 | ◯ |
| Comparative Example 15 | 0.5 | no chain-like silica | | 0.1 | 3.0 | 71.8 | ◯ |

| | Parameter of surface roughness P10 (nm) | Relative standard deviation of height distribution of protrusions | Tracking resistance | Durability | Lamination structure |
|---|---|---|---|---|---|
| Example 13 | 100 | 0.5 | excellent | excellent | A/B/C/B/A (five layers) |
| Example 14 | 150 | 0.6 | excellent | excellent | A/B/C/B/A (five layers) |
| Comparative Example 15 | 320 | 1.2 | not good | not good | A/B/C/B/A (five layers) |

EXAMPLE 15 (TABLE 5)

Calcium carbonate particles having a mean primary particle size of 0.8 μm prepared as particles B were dispersed in ethylene glycol using glass beads having a diameter of 50 μm as media. After removing the glass beads, the mixture was polymerized with terephthalic acid to make master pellets of polyethylene terephthalate.

On the other hand, alumina particles having a mean primary particle size of 10 nm prepared as particles A, whose crystal form was δ-type, were dispersed uniformly in ethylene glycol using the above media dispersion method, and master pellets containing particles A were prepared in a manner similar to that described above.

Chips containing 10wt % dodecylbenzene sodium sulphate and 10wt % polyethylene glycol of 10 parts by weight, the above master pellets containing particles B of 20 parts by weight, the master pellets containing particles A of 30 parts by weight and pellets of polyethylene terephthalate with no particles were blended, and the blended pellets were supplied to a vent-type twin-screw extruder and molten at a temperature of 280° C. (polymer I). Further, another extruder was prepared, the pellets with no particles were dried at a temperature of 180° C. for 8 hours (3 Torr), the dried pellets were supplied to the extruder and molten at a temperature of 290° C. (polymer II). After filtering these two polymers at a high accuracy in filtration degree, the polymers were laminated by a feed block for three layers having a rectangular shaped lamination portion so that the polymer II was positioned as the base layer and the polymer I was laminated on both surfaces of the base layer as both outermost layers. The laminated polymer was delivered out from a fish tail type die in the form of a sheet, the delivered sheet was cast on a casting drum of which surface temperature was controlled at 30° C. and cooled and solidified on the drum using an electrostatic charging method to form a non-stretched film having a thickness of about 160 μm. In this casting, the draft ratio was 6.5.

The non-stretched film obtained was stretched in the longitudinal direction at three stages the respective conditions of temperatures and draw ratios of which were 123° C., 1.2 times; 126° C. 1.45 times; and 114° C., 2.3 times The uniaxially stretched film obtained was stretched, using a stenter, in the transverse direction at two stages the respective conditions of temperatures and draw ratios of which were 111° C. 3.7 times and 113° C., 1.2 times, and heat treated at conditions of a temperature of 200° C. and a constant length for five seconds to make a biaxially oriented film having a thickness of 13 μm. The relationship between the thickness T of the outermost layer and the particle size D of particles A was T=50D. The particle densities of particles A and the lamination thicknesses of both outermost layers were the same. The parameter of surface roughness P10 of this film was 85 nm.

The electromagnetic conversion property of the film was 3.2 dB in chromatic S/N. The abrasion resistance was 50 μm and it was good. Thus, in a case where the kind, the particle size, the content, the particle density ratio at surface layer and the lamination thickness of the outermost layer satisfy the range according to the present invention, a film having an excellent electromagnetic conversion property and a good abrasion resistance.

EXAMPLES 16 AND 17, COMPARATIVE EXAMPLES 20 AND 21 (TABLE 5)

Biaxially oriented laminated films were made in the similar manner to that of Example 15, and the particles were contained in the outermost layers as well as dodecylbenzene sodium sulphate or dodecylbenzene lithium sulphate was contained and polyethylene glycol was contained as polyalkylene glycol (Examples 16 and 17). Compared were the case where particles were not contained and only dodecylbenzene sodium sulphate was contained (Comparative Example 20) and the case where polyethylene glycol was contained together with dodecylbenzene sodium sulphate but the content was out of the range according to the present invention (Comparative Example 21). It is understood that the surface resistivity is lowered by containing an appropriate amount of sulfonic acid metallic salt and polyethylene glycol and shaking of regenerated image can be prevented.

COMPARATIVE EXAMPLES 16–19 (TABLE 6)

Biaxially oriented laminated films were made in the similar manner to that of Example 15, changing the kind, the particle size, the content and the thickness T of the outermost layer. If any of these conditions is out of the range according to the present invention, both of an excellent electromagnetic conversion property and a good abrasion resistance cannot be achieved.

and said mean primary particle size D and thickness T of the outermost layer satisfying the equation $D <= T <= 200D$.

TABLE 5

| | Particle in outermost layer | | | | Parameter of surface roughness P10 (nm) | Electromagnetic conversion property (dB) | Abrasion resistance ($\mu$m) | Composition contained in outermost layer | Surface resistivity ($\Omega/\square$) | Shaking of regenerated image |
|---|---|---|---|---|---|---|---|---|---|---|
| | Particle density ratio at surface layer | Content (wt %) | Particle size (nm) | T/D | | | | | | |
| Example 15 | 0.04 | 0.3 | 10 | 50 | 85 | +3.2 | 50 | DBSNa 1% PEG 1% | $2 \times 10^{12}$ | good |
| Example 16 | 0.10 | 0.3 | 10 | 60 | 100 | +2.8 | 60 | DBSNa 1.5% PEG 1% | $5 \times 10^{13}$ | good |
| Example 17 | 0.08 | 0.2 | 5 | 80 | 95 | +2.5 | 100 | DBSLi 1% PEG 0.5% | $5 \times 10^{11}$ | good |
| Comparative Example 20 | not contained | — | — | — | 250 | −0.1 | — | DBSNa 1% | $1 \times 10^{15}$ | not good |
| Comparative Example 21 | not contained | — | — | — | 260 | −0.1 | — | DBSNa 0.1% PEG 0.1% | $2 \times 10^{14}$ | not good |

(Note)
DBSNa: dodecylbenzene sodium sulphate

DBSLi: dodecylbenzene lithium sulphate

PEG: polyethylene glycol

TABLE 6

| | Particle in outermost layer | | | | Recycle polymer in intermediate layer | Parameter of surface roughness P10 (nm) | Electromagnetic conversion property (dB) | Abrasion resistance ($\mu$m) |
|---|---|---|---|---|---|---|---|---|
| | Particle density ratio at surface layer | Content (wt %) | Particle size (nm) | T/D | | | | |
| Comparative Example 16 | not contained | — | — | — | x | 200 | 0 | 250 |
| Comparative Example 17 | not contained | — | — | — | x | 300 | −0.2 | 230 |
| Comparative Example 18 | 0.005 | 2.5 | 500 | 5 | x | 250 | +0.2 | 300 |
| Comparative Example 19 | 0.002 | 0.5 | 500 | 0.8 | x | 220 | +0.3 | 350 |

Although several preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A biaxially oriented laminated film having at least three layers, wherein an outermost layer contains particles A, said particles A comprising primary particles and secondary particles the ratio of (a) the particle density of said particles A in said outermost layer at a depth of 3 nm to (b) the particle density of said particles A in said outermost layer at a depth of 30 nm being not less than 0.01, the ratio E/D of the mean secondary particle size E to the mean primary particle size D of the particles A being in the range of 2–60, 2. The biaxially oriented laminated film according to claim 1, wherein said layer containing the particles A is composed of polyester.

3. The biaxially oriented laminated film according to claim 1, wherein particles B having a mean particle size greater than that of the particles A are also contained in said layer containing the particles A.

4. The biaxially oriented laminated film according to claim 3, wherein the mean particle size D1 of the particles B and the thickness T of the layer containing the particles A and B satisfies the equation; $0.5D1 \leq T \leq 5D1$.

5. The biaxially oriented laminated film according to claim 3, wherein the mean particle size D1 of the particles B is in the range of 0.1 to 2 $\mu$m.

6. The biaxially oriented laminated film according to claim 3, wherein the content of the particles A and B in said layer containing the particles B is in the range of 0.005 to 5% by weight.

7. The biaxially oriented laminated film according to claim 3, wherein the relative standard deviation of the distribution of the particle size of the particles B is not greater than 0.6.

8. The biaxially oriented laminated film according to claim 3, wherein said particles B are selected from the group consisting of calcium carbonate particles, cross-linked polymer particles and colloidal silica particles.

9. The biaxially oriented laminated film according to claim 8, wherein said calcium carbonate particles are of the vaterite structure.

10. The biaxially oriented laminated film according to claim 3, wherein particles C having a mean particle size greater than that of the particles A and smaller than that of the particles B are also contained in said layer containing the particles A and the particles B.

11. The biaxially oriented laminated film according to claim 1, wherein the mean primary particle size D of the particles A is in the range of 1 to 300 nm.

12. The biaxially oriented laminated film according to claim 1, wherein the content of the particles A in said layer containing the particles A is in the range of 0.01 to 2% by weight.

13. The biaxially oriented laminated film according to claim 1, wherein said particles A are selected from the group consisting of zirconia, chain-shaped silica and alumina particles.

14. The biaxially oriented laminated film according to claim 1, wherein said particles A form non-incorporated particles internally of which seeds are the particles A.

15. The biaxially oriented laminated film according to claim 1, wherein said biaxially oriented laminated film is a laminated film having at least four layers comprising an intermediate layer, cover layers laminated on both surfaces of the intermediate layer and said outermost layer being laminated on at least one of the cover layers.

16. The biaxially oriented laminated film according to claim 15, wherein the thickness of said intermediate layer is not less than 0.1 μm.

17. The biaxially oriented laminated film according to claim 15, wherein the thickness of each of said cover layers is not less than 0.2 μm.

18. The biaxially oriented laminated film according to claim 15, wherein each of said cover layers contains particles, and the content of said particles contained in each of said cover layers is not greater than 2% by weight.

19. The biaxially oriented laminated film according to claim 1, wherein the surface resistivity of at least one outermost layer of said biaxially oriented laminated film is not greater than $1 \times 10^{14} \Omega/\square$.

20. The biaxially oriented laminated film according to claim 19, wherein a sulfate group compound is added to said at least one outermost layer with a surface resistivity of not greater than $1 \times 10^{14} \Omega/\square$ at a content of 0.2 to 5% by weight.

* * * * *